(12) United States Patent
Kinser et al.

(10) Patent No.: US 8,924,057 B2
(45) Date of Patent: Dec. 30, 2014

(54) METHOD FOR STARTING A HYBRID VEHICLE

(75) Inventors: Christopher A. Kinser, Grand Blanc, MI (US); Keith D. Buford, Southfield, MI (US); Kathy D. Rose, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1005 days.

(21) Appl. No.: 12/821,471

(22) Filed: Jun. 23, 2010

(65) Prior Publication Data

US 2011/0231034 A1 Sep. 22, 2011

Related U.S. Application Data

(60) Provisional application No. 61/315,817, filed on Mar. 19, 2010.

(51) Int. Cl.
  *G06F 19/00* (2011.01)
  (Continued)

(52) U.S. Cl.
  CPC ............... *B60K 6/46* (2013.01); *B60L 3/0046* (2013.01); *B60L 7/14* (2013.01); *B60L 11/14* (2013.01); *B60L 11/1816* (2013.01); *B60L 11/1877* (2013.01); *B60L 11/1879* (2013.01); *B60W 30/18054* (2013.01); *B60W 30/192* (2013.01); *B60L 2210/12* (2013.01); *B60L 2210/14* (2013.01); *B60L 2210/30* (2013.01); *B60L 2210/40* (2013.01); *B60W 10/06* (2013.01); *B60W 20/00* (2013.01);
  (Continued)

(58) Field of Classification Search
  CPC ........................................................ B60K 6/46
  USPC ............................ 701/201, 2, 22; 180/65.275
  See application file for complete search history.

(56) References Cited

U.S. PATENT DOCUMENTS 6,646,421 B2 * 11/2003 Kimura et al. ................ 320/132
7,769,505 B2 * 8/2010 Rask et al. ...................... 701/22
(Continued)

FOREIGN PATENT DOCUMENTS

WO WO2009104634 A1 8/2009

OTHER PUBLICATIONS

German Office Action dated Feb. 20, 2013, (5 pages).

*Primary Examiner* — Thomas G Black
*Assistant Examiner* — Wae Louie
(74) *Attorney, Agent, or Firm* — Lionel D. Anderson; Reising Ethington P.C.

(57) ABSTRACT

A method for starting a hybrid vehicle when the vehicle is already connected to an external power source. In some hybrid vehicles, it can be undesirable for an external power source (e.g., an AC power outlet) and an internal power source (e.g., an internal combustion engine/generator) to simultaneously provide the vehicle with electrical energy. There are a variety of reasons why this may be true. For instance, some hybrid vehicles may have difficulty accurately estimating the state-of-charge (SOC) of the vehicle battery when both external and internal power sources are simultaneously providing electrical energy to the vehicle's high voltage bus. The method described herein can arbitrate or otherwise determine which power source is preferable for the circumstances and then activate or enable that power source accordingly.

20 Claims, 2 Drawing Sheets

(51) Int. Cl.
*F02N 11/14* (2006.01)
*B60K 6/46* (2007.10)
*B60L 3/00* (2006.01)
*B60L 7/14* (2006.01)
*B60L 11/14* (2006.01)
*B60L 11/18* (2006.01)
*B60W 30/18* (2012.01)
*B60W 30/192* (2012.01)
*B60W 10/06* (2006.01)
*B60W 20/00* (2006.01)

(52) U.S. Cl.
CPC ......... *Y02T 10/6217* (2013.01); *Y02T 10/6269* (2013.01); *Y02T 10/7005* (2013.01); *Y02T 10/705* (2013.01); *Y02T 10/7077* (2013.01); *Y02T 10/7088* (2013.01); *Y02T 90/121* (2013.01); *Y02T 90/127* (2013.01); *Y02T 90/14* (2013.01); *Y02T 10/7241* (2013.01); *Y02T 10/7233* (2013.01); *Y02T 10/7225* (2013.01)

USPC ........... 701/22; 701/2; 180/65.1; 180/65.265; 180/65.285; 320/101; 320/132

(56) References Cited

U.S. PATENT DOCUMENTS

| | | | |
|---|---|---|---|
| 8,548,659 B2* | 10/2013 | Tanaka | 701/22 |
| 2007/0029121 A1* | 2/2007 | Saitou et al. | 180/65.2 |
| 2007/0068714 A1* | 3/2007 | Bender | 180/65.4 |
| 2008/0053716 A1* | 3/2008 | Scheucher | 180/2.1 |
| 2008/0169138 A1* | 7/2008 | Grand et al. | 180/65.2 |
| 2008/0275600 A1* | 11/2008 | Rask et al. | 701/22 |
| 2009/0145674 A1* | 6/2009 | Lee et al. | 180/65.1 |
| 2009/0212626 A1* | 8/2009 | Snyder et al. | 307/10.1 |
| 2009/0309537 A1* | 12/2009 | Saito | 320/101 |
| 2011/0000726 A1* | 1/2011 | Tanaka | 180/65.265 |
| 2011/0231034 A1* | 9/2011 | Kinser et al. | 701/2 |
| 2011/0320082 A1* | 12/2011 | Ishishita | 701/22 |

* cited by examiner

METHOD FOR STARTING A HYBRID VEHICLE

REFERENCE TO RELATED APPLICATIONS

This application claims the benefit of U.S. Provisional Ser. No. 61/315,817 filed on Mar. 19, 2010.

TECHNICAL FIELD

The present invention generally relates to a hybrid vehicle and, more particularly, to a method for starting a hybrid vehicle when it is already connected to an external power source, such as an AC power outlet

BACKGROUND

Some hybrid vehicle architectures do not allow an external power source, like an AC power outlet, and an internal power source, such as a generator, to simultaneously provide the vehicle with high voltage electrical energy. In such architectures, the hybrid vehicle may automatically turn off or disconnect the external power source when a request to start the vehicle is received, without regard to the particular needs or availability of electrical energy in the hybrid vehicle.

SUMMARY

According to one aspect, there is provided a method for starting a hybrid vehicle, comprising the steps of: (a) receiving a request to start a hybrid vehicle having a primary power source and an auxiliary power source, wherein the hybrid vehicle is already connected to an external power source; (b) determining if the auxiliary power source is needed in order to satisfy the request to start the hybrid vehicle; and (c) if the method determines that the auxiliary power source is needed in order to satisfy the request to start the hybrid vehicle then deactivating the external power source and activating the auxiliary power source, and if the method determines that the auxiliary power source is not needed in order to satisfy the request to start the hybrid vehicle then activating or keeping active the external power source.

According to another aspect, there is provided a method for starting a hybrid vehicle, comprising the steps of: (a) receiving a request to start a hybrid vehicle having a primary power source and an auxiliary power source, wherein the hybrid vehicle is already connected to an external power source; (b) activating a vehicle propulsion system in response to the request to start the hybrid vehicle by closing one or more main contactors in the hybrid vehicle; and (c) providing electrical energy from the external power source to the hybrid vehicle after the vehicle propulsion system has been activated, instead of automatically deactivating the external power source in response to the request to start the hybrid vehicle.

According to another aspect, there is provided a hybrid vehicle, comprising: a primary power source connected to an external power source; an auxiliary power source; a vehicle propulsion system; and a control system. In response to receiving a request to start the hybrid vehicle, the control system: i) activates the vehicle propulsion system, ii) determines if the auxiliary power source is needed in order to satisfy the request to start the hybrid vehicle, and iii) deactivates the external power source and activates the auxiliary power source if the control system determines that the auxiliary power source is needed in order to satisfy the request to start the hybrid vehicle, and activates or keeps active the external power source if the control system determines that the auxiliary power is not needed in order to satisfy the request to start the hybrid vehicle.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE EMBODIMENTS

Figure 1:
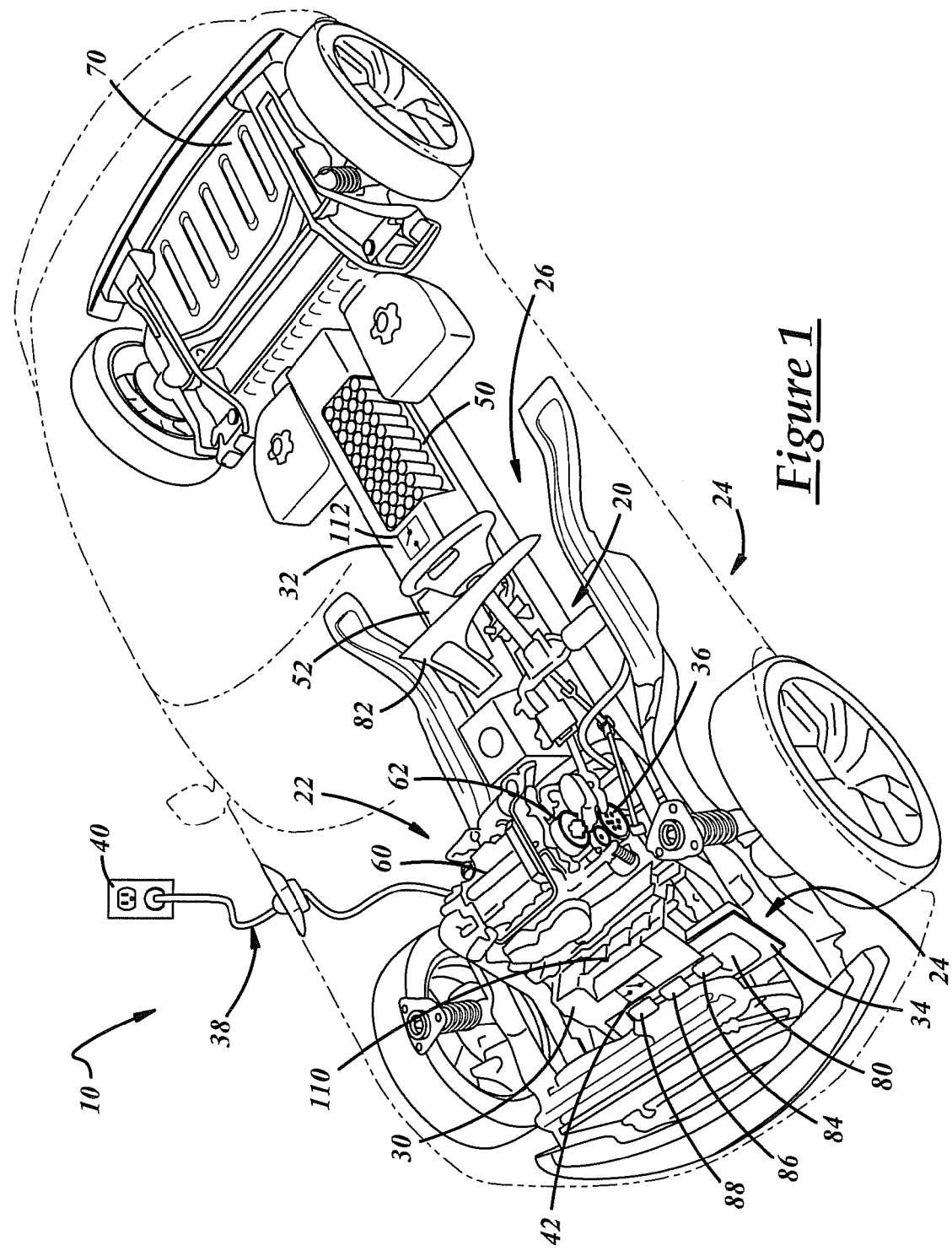
FIG. 1 is a perspective view depicting portions of an exemplary hybrid vehicle.

The method described below may be used to start a hybrid vehicle when the vehicle is already connected to an external power source. In some hybrid vehicles, it can be undesirable for an external power source (e.g., an AC power outlet) and an internal power source (e.g., an internal combustion engine/generator) to simultaneously provide the vehicle with electrical energy. There are a variety of reasons why this may be true. For instance, some hybrid vehicles may have difficulty accurately estimating the state-of-charge (SOC) of the vehicle battery when both external and internal power sources are simultaneously providing electrical energy to the vehicle's high voltage bus. Other reasons for avoiding this type of simultaneous or concurrent charging scenario may also exist.

Sometimes, if a vehicle user attempts to start a hybrid vehicle that is currently connected to an external power source, the vehicle will automatically disconnect or disable the external power source and then connect or enable the internal power source. This guarantees that the two power sources are not providing electrical energy to the hybrid vehicle at the same time. Although such an approach may prevent the simultaneous provision of electrical energy by both external and internal power sources, it does not necessarily take advantage of the cheapest form of power, which is usually the power provided by the external power source. To illustrate, consider a hybrid vehicle that is plugged into an AC power outlet and has been charging overnight. If a vehicle user engages a remote start feature, the hybrid vehicle may automatically disconnect the AC power outlet and activate an onboard engine/generator to produce electrical energy. Instead of using electrical energy from the AC wall outlet during this "warm-up" period—which is typically the cheapest form of available energy—the hybrid vehicle uses electrical energy from the onboard engine/generator, which must consume fuel in order to produce such energy. The method described herein, on the other hand, can arbitrate or otherwise determine which power source is preferable for the circumstances and then activate or enable that power source accordingly.

A "hybrid vehicle," as used herein, broadly includes any vehicle that has two or more sources of power that can be used for purposes of vehicle propulsion. Some examples of suitable hybrid vehicles include, but are certainly not limited to, hybrid electric vehicles (HEVs), plug-in hybrid electric vehicles (PHEVs), extended-range electric vehicles (EREVs), two-mode hybrids, full hybrids, power-assist hybrids, mild hybrids, series hybrids, parallel hybrids, series-parallel hybrids, power-split hybrids, BAS or BAS-plus hybrids, hydraulic hybrids, pneumatic hybrids, or any other type of hybrid vehicle. This includes passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any hybrid vehicle and is not limited to any particular type.

With reference to FIG. 1, there is shown a schematic view of an exemplary plug-in hybrid electric vehicle (PHEV) 10 having a range-extending series hybrid configuration where a high voltage battery drives an electric motor for vehicle propulsion, and an internal combustion engine drives a generator for producing electrical energy. According to this exemplary embodiment, hybrid vehicle 10 includes a primary power source 20, an auxiliary power source 22, a control system 24, and a vehicle propulsion system 26. Because many of the components of hybrid vehicle 10 are generally known in the art and because many different components and arrangements may be used with the present method, a brief explanation is provided here in lieu of a detailed recitation of their individual structure and functionality.

Primary power source 20 is largely responsible for vehicle propulsion and, according to this particular embodiment, includes a charger 30, a battery 32, an inverter/converter 34, and one or more electric motor(s) 36. In general, battery charger 30 may receive electrical energy from one or more sources, convert and/or condition the electrical energy so that it is in a suitable form for battery 32, and provide the converted electrical energy to the battery where it is stored. During vehicle propulsion, battery 32 provides electrical energy to inverter/converter 34 where it is again converted, this time into a form suitable for electric motor 36, and provided to the electric motor for driving the wheels of the vehicle. During regenerative braking, electric motor 36 may act as a generator and provide electrical energy to battery 32 via inverter/converter 34.

Charger 30 may receive electrical energy from a variety of sources, including external power sources 40 (e.g., standard AC power outlets, remote and/or renewable charging stations, external generators, etc.) and internal power sources (e.g., an onboard generator). In the case of an external power source 40, charger 30 may receive electrical energy through a suitable power coupling or charging cord 38 that connects the external power source to the charger. Charging contactors 42 electrically connect charger 30 with external power source 40 and may include one or more electrical switches that are controlled by control system 26 or some other suitable control unit, device, system, etc. Skilled artisans will appreciate that charger 30 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 32 may store electrical energy that is used to drive electric motor(s) 36, as well as to meet other electrical needs of the hybrid vehicle. According to an exemplary embodiment, battery 32 includes a high-voltage battery pack 50 (e.g., 40V-600V) and a sensor unit 52. Battery pack 50 includes a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 32 should be designed to withstand repeated charge and discharge cycles and may be used in conjunction with other energy storage devices, such as capacitors, super capacitors, inductors, etc. Those skilled in the art will appreciate that battery 32 may be provided according to any number of different embodiments, may be connected in any number of different configurations, and may include any number of different components, like sensors, control units and/or any other suitable components known in the art.

Inverter/converter 34 may act as an intermediary between battery 32 and electric motor(s) 36, as these devices are often times designed to function according to different operational parameters. For example, during vehicle propulsion inverter/converter 34 can step-up the voltage from battery 32 and invert the current from DC to AC in order to drive electric motor(s) 36, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC inversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device, however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Electric motor(s) 36 may use electrical energy stored in battery 32 and/or provided by auxiliary power source 22 to drive the vehicle wheels, which in turn propels the hybrid vehicle. While FIG. 1 schematically depicts electric motor 36 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Thus, the following description only refers to a single electric motor 36 even though more than one electric motor may be used by the hybrid vehicle. Primary power source 20 is not limited to any one particular type of electric motor, as many different motor types, sizes, technologies, etc. may be used. In one example, electric motor 36 includes an AC motor (e.g., a three-phase AC induction motor, etc.) as well as a generator that can be used during regenerative braking. Electric motor 36 may be provided according to any number of different embodiments (e.g., AC or DC motors, brushed or brushless motors, permanent magnet motors, etc.), may be connected in any number of different configurations, and may include any number of different components, like cooling features, sensors, control units and/or any other suitable components known in the art.

Auxiliary power source 22 may provide electrical energy in the event that battery 32 is depleted and, according to this particular embodiment, includes an engine 60 and a generator 62. In general, engine 60 turns generator 62, which in turn creates electrical energy that may be used to recharge battery 32, to drive electric motor 36 or other electrical devices in the hybrid vehicle, or to do both. The specific allocation of electrical energy from generator 62 may be influenced by the state of the battery (e.g., the battery state-of-charge (SOC), etc.), by performance demands on the motor (e.g., is the driver trying to accelerate the vehicle), etc. In another embodiment, engine 60 is replaced with a fuel cell stack, a hydraulic or pneumatic system, or some other alternative energy supply that is capable of providing electrical energy to the hybrid vehicle.

Engine 60 may drive generator 62 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 60 is a small fuel-efficient engine (e.g., a small displacement, turbo-charged four-cylinder engine) that receives fuel from fuel tank 70 and uses the mechanical output of the engine to turn generator 62. Skilled artisans will appreciate that engine 60 may be provided according to any number of different embodiments, may be connected in any number of different configurations (e.g., engine 60 could be part of a parallel hybrid system where the engine is also mechanically coupled to the vehicle wheels instead of exclusively being used to generate electricity), and may include any number of different components, like sensors, control units and/or any other suitable components known in the art.

Generator 62 is mechanically coupled to engine 60 so that the mechanical output of the engine causes the generator to create electrical energy that may be provided to battery 32, electric motor 36, other vehicle components, or a combination thereof. As with all of the exemplary components described herein, generator 62 may include one of any number of suitable generators known in the art and is certainly not limited to any particular type. It is worth noting that generator 62 may be provided according to any number of different embodiments (e.g., the generator of motor 36 and generator 62 may be combined into a single unit), may be connected in any number of different configurations, and may include any number of different components, like cooling units, sensors, control units and/or any other suitable components known in the art. Again, the preceding description of exemplary hybrid vehicle 10 and the illustration in FIG. 1 are only intended to illustrate one potential hybrid arrangement and to do so in a general way. Any number of other hybrid arrangements and architectures, including those that differ significantly from the one shown in FIG. 1, may be used instead.

Control system 24 may be used to control, govern or otherwise manage certain operations or functions of hybrid vehicle 10 and, according to one exemplary embodiment, includes a hybrid control unit 80, a user interface 82, and a body control unit 90. Hybrid control unit 80 may use stored algorithms or other electronic instructions to manage the activities of the various components and devices of both the primary power source 20 and the auxiliary power source 22 so that these two systems can seamlessly interact with one another and can react to a variety of changing conditions. Depending on the particular embodiment, hybrid control unit 80 may be a stand-alone electronic module (e.g., a vehicle integrated control module (VICM), a traction power inverter module (TPIM), a battery power inverter module (BPIM), etc.), it may be incorporated or included within another electronic module in the vehicle (e.g., a power train control module, an engine control module, etc.), or it may be part of a larger network or system (e.g., a battery management system (BMS), a vehicle energy management system, etc.), to name a few possibilities. According to this particular embodiment, hybrid control unit 80 is at least partially responsible for performing certain aspects of the method described below.

Moreover, hybrid control unit 80 may include any combination of electronic processing devices 84, memory devices 86, input/output (I/O) devices 88, and/or other known components, and may perform various control and/or communication related functions. Processing device 84 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 86 may include any type of suitable electronic memory means and may store a variety of data and information. This includes, for example: sensed vehicle conditions; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory device 86. Hybrid control unit 80 may be electronically connected to other vehicle devices and modules via I/O device 88 and suitable connections, like a communications bus, so that they can interact as required. These are, of course, only some of the possible arrangements, functions and capabilities of hybrid control unit 80, as others are certainly possible.

User interface 82 may be used to exchange information between a vehicle user and the vehicle, and may do so in a variety of ways. For instance, user interface 82 may receive user requests, instructions and/or other input from a vehicle user via: a touch-screen display, a pushbutton or other vehicle control, a keyboard, a microphone (e.g., cases where input is verbally provided and interpreted by a human-machine interface (HMI)), or a wireless communication module (e.g., cases where input is wirelessly provided from a mobile communications device, laptop, desktop, website, call center, backend facility, etc.), to cite a few examples. In addition, user interface 82 may be used to provide vehicle status, reports and/or other output to the vehicle user. The same devices and techniques for providing input, as well as others like a vehicle audio system and instrument panel, may also be used to provide output. Other user interfaces may be provided instead, as the exemplary ones shown and described herein represent only some of the possibilities. The present method may utilize any user interface to exchange information with the vehicle and is not limited to any particular type.

Body control unit 90 may use stored algorithms or other electronic instructions to manage the activities of various devices and components throughout the hybrid vehicle. Depending on the particular embodiment, body control unit 90 may be a stand-alone electronic module (e.g., a body control module (BCM), etc.), it may be incorporated or included within another electronic module in the vehicle (e.g., an engine control module (ECM), etc.), or it may be part of a larger network or system, to name a few possibilities. According to this particular embodiment, body control unit 90 is at least partially responsible for receiving and processing remote start requests, whether they be initiated from a user-activated key fob or from a telematics facility or call center. Skilled artisans will appreciate that the body control unit 90 may include any combination of electronic processing devices 94, memory devices 96, input/output (I/O) devices 98, and/or other known components, and may perform various control and/or communication related functions. Body control units or modules are widely understood in the art; thus, a detailed description of one has been omitted here.

Hybrid control unit 80, body control unit 90, as well as other components, devices, modules and/or systems in the hybrid vehicle may require low voltage DC power (e.g., 12V, 18V or 42V) in order to operate. This low voltage power can be provided to these devices in a number of different ways, including through an accessory power module (APM) 110. APM 110 couples or connects high and low voltage circuits within the vehicle, and may perform a number of different functions in that capacity. For instance, APM 110 may include a step-down transformer and other electrical components for stepping-down the voltage on a high voltage circuit or bus (e.g., a voltage of 350V) to the lower level of a low voltage circuit or bus (e.g., a voltage of 12V or 42V). Thus, APM 110 can provide a steady and dependable source of low voltage DC power to the components of the low voltage circuit; this includes, for example, various modules and control units (e.g., hybrid control unit 80, body control unit 90, etc.), as well as any other component, device, system, etc. that requires low voltage power. It should be appreciated that the terms "high voltage" and "low voltage" are not limited to any particular voltage rating. Therefore, while some preferred voltage ratings and ranges are provided above for purposes of illustration, the system and method described herein are not limited to such embodiments.

Vehicle propulsion system 26 propels hybrid vehicle 10 and may include any combination of components, parts, devices, systems, etc. that contribute to the propulsion or movement of the hybrid vehicle. For instance, vehicle propulsion system 26 may include one or more components from primary power source 20 (e.g., battery 32, inverter/converter 34, electric motor 36, etc.), one or more components from auxiliary power source 22 (e.g., engine 60, generator 62, etc.), additional components like main contactors 112, or some combination thereof. In an exemplary embodiment, vehicle propulsion system 26 includes battery 32, inverter/converter 34, electric motor 36 and main contactors 112, where the main contactors include one or more electrical switches that when 'closed' electrically connect the battery with the vehicle's high voltage and/or low voltage electrical systems so that electrical energy may be made available to the electric motor(s) for driving the hybrid vehicle. When main contactors 112 are 'open', the high voltage electrical energy that is stored in battery 32 is generally not available or is disconnected from the rest of the hybrid vehicle. Other embodiments of vehicle propulsion system 26 are also possible, as the preceding description is only meant to be a general and illustrative account of one possible embodiment.

The exemplary hybrid vehicle 10 may include more, less or a different combination of elements, components, devices and/or modules than those illustrated and described here, as the present method is not limited to this particular embodiment. For example, hybrid vehicle 10 may include parts such as: a hybrid transmission, a power-split device, a gear box, one or more clutches, a flywheel and/or other hybrid drivetrain components; a low-voltage electrical circuit or bus (e.g., standard 12V, 18V or 42V circuits), electronic accessories, different electronic modules, a telematics unit, additional electric motors and/or other electronic devices; as well as any other devices that may be found on hybrid vehicles. The components, devices and/or modules shown in FIG. 1 may be integrated or otherwise combined with other parts of the hybrid vehicle, as the illustration in that figure is only meant to generally and schematically illustrate one potential hybrid system arrangement.

Figure 2:
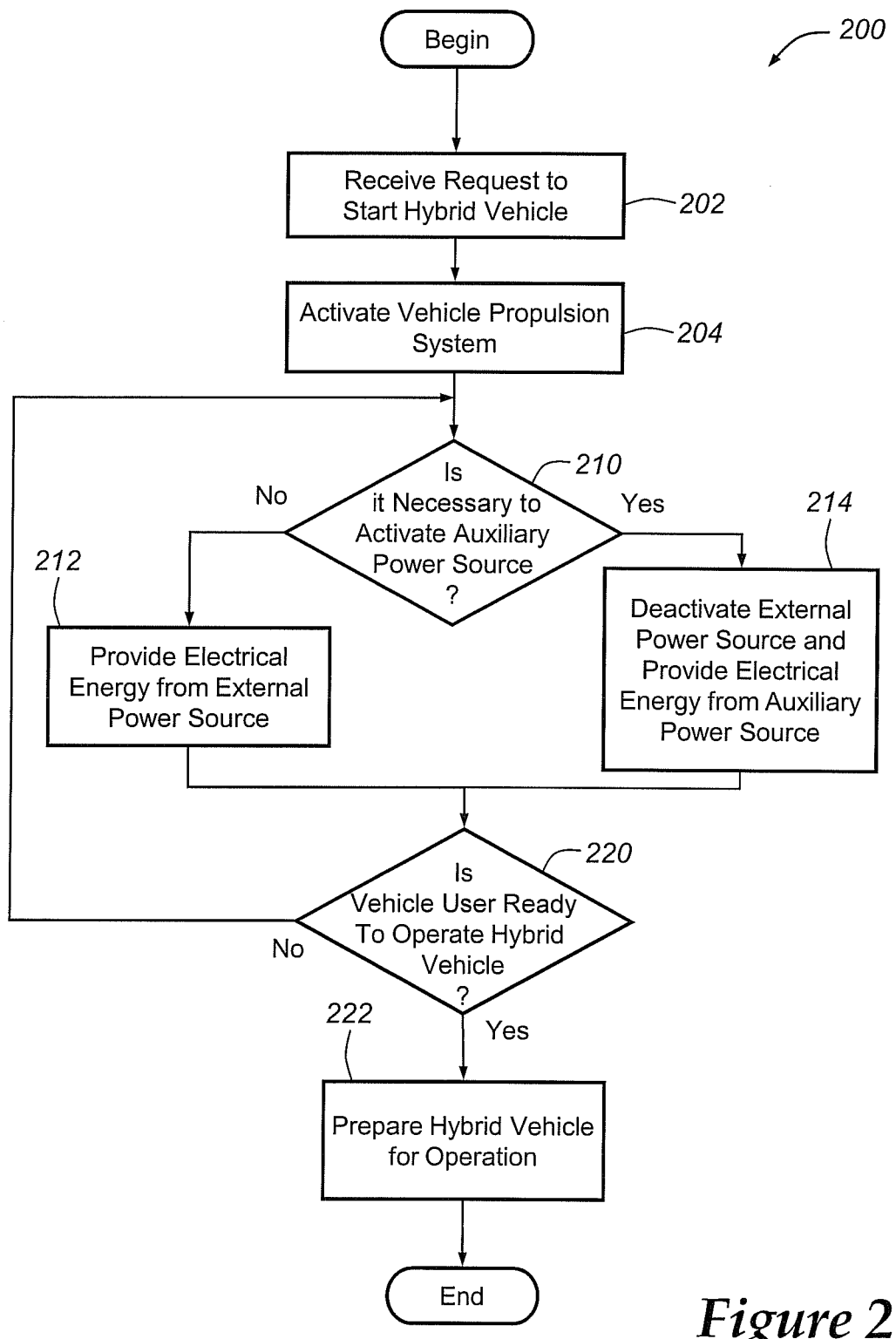
FIG. 2 is a flowchart illustrating certain steps of an exemplary method that may be used to start a hybrid vehicle, such as the exemplary one shown in FIG. 1.

Turning now to FIG. 2, a flowchart is provided that illustrates some of the steps of an exemplary method 200 for starting a hybrid vehicle. More particularly, method 200 may be used to start a hybrid vehicle when the vehicle is already connected to an external power source, such as AC power outlet 40. Method 200 can arbitrate or otherwise determine which power source is most appropriate for the current circumstances, instead of automatically disconnecting or disabling the external power source. This enables exemplary method 200 to both prevent simultaneous charging by external and internal power sources (a requirement of some hybrid vehicles) and to lower the energy costs of the vehicle, for example.

In a first step 202, the method receives a request to start or otherwise activate a hybrid vehicle 10 that is already connected to an external power source 40. This request could originate at any number of different sources and could be conveyed to hybrid vehicle 10 in a variety of different ways. For example, a request to start the hybrid vehicle could be sent by a key-fob or other wireless device, processed by body control unit 90 or some other module in the vehicle, and provided to control system 24. In other embodiments, the request to start the hybrid vehicle could be provided by a vehicle user manually engaging an ignition system, or by a back-end telematics facility or call center. The particular manner in which the request to start the hybrid vehicle is provided and/or received is not critical, as step 202 may include any suitable technique known in the art.

In response to the reception of a request to start the vehicle, step 204 may activate vehicle propulsion system 26 and/or some other aspect of the hybrid vehicle. Generally speaking, "activating the vehicle propulsion system," in the context of step 204, may include one or more of the following steps: closing the main contactors 112 that electrically connect battery 32 with the rest of the hybrid vehicle's high voltage electrical system; enabling accessory power module (APM) 110 so that devices like hybrid control unit 80 and body control unit 90 are supplied with low voltage power; and executing start-up or other initialization routines within various components, devices, modules and/or systems around the vehicle. The above-listed steps may be part of a typical hybrid vehicle start-up routine, and can certainly include other steps in addition to or in lieu of those mentioned here.

Next, step 210 determines if auxiliary power source 22 is needed in order to satisfy or otherwise fulfill the request to start the hybrid vehicle. It is not always necessary to activate an auxiliary power source, like engine 60/generator 62, when a user attempts to start a hybrid vehicle. In some situations, the hybrid vehicle can continue to receive electrical energy from an external power source 40, such as an AC power outlet, until the vehicle user is ready to drive off. Consider the situation where a hybrid vehicle is plugged into a standard AC power outlet, the vehicle has been charging over night such that the battery SOC is quite high, and a vehicle user engages a wireless keyfob in order to remotely start the vehicle (e.g., to warm up or otherwise condition the vehicle cabin on a cold day). In response to this situation, step 210 may gather a variety of information in order to determine if it is necessary to activate engine 60/generator 62. In some cases it may be necessary for method 200 to activate auxiliary power source 22, in other cases it may not.

There are a variety of different circumstances where it may be necessary to activate auxiliary power source 22 because external power source 40 is unable to fully address the electrical needs of the hybrid vehicle. For example, if battery 32 is in a depleted state (e.g., low state-of-charge (SOC), state-of-health (SOH), voltage, current, etc.), if there is a battery failure or fault that prevents battery 32 from being properly charged with external power source 40, if the overall electrical demand in the hybrid vehicle exceeds the electrical energy available from external power source 40, or if there are "time-of-day-constraints" that prohibit charging during periods of the day with higher utility rates, then it may be necessary to activate auxiliary power source 22. The preceding examples are, of course, only some of the possible situations or conditions that could necessitate activating auxiliary power source 22, as others also exist. Consider the exemplary situation where control system 24 determines that a 110V AC power outlet 40 is able to provide the hybrid vehicle with 1,200 W of electrical energy, yet an air conditioning (A/C) compressor requires 5,000 W. Clearly, the external power source in this example is incapable of fully satisfying the electrical needs of the vehicle such that auxiliary power source 22 must be activated (engine 60/generator 62 usually provide more electrical energy than the external power source, but not necessarily). As mentioned before, some hybrid vehicles have an architecture that prohibits both external and internal power sources from simultaneously providing the vehicle's high voltage bus with electrical energy. Thus, exemplary method 200 may implement a "handshake" or other arbitration process between the primary power source 20 which receives electrical energy from external power source 40, and the auxiliary power source 22 which generates electrical energy by combusting gasoline or other fuel.

If step 210 determines that it is not necessary to activate auxiliary power source 22, then the method proceeds to step 212 so that external power source 40 may continue to provide the hybrid vehicle with electrical energy. It is possible to provide electrical energy from external power source 40 to hybrid vehicle 10 after vehicle propulsion system 26 has been activated, instead of automatically deactivating the external power source in response to the request to start the hybrid vehicle, as is the case with some hybrid systems. This step may include activating external power source 40 by closing charging contactors 42 or taking some other action, such as the case when the external power source is already connected to the hybrid vehicle but is currently deactivated because the battery is fully charged; or this step may include keeping or maintaining the external power source in an active state, such as the case when the external power source is already connected to the hybrid vehicle and is already active. Step 210 may include other actions or tasks as well.

Because electrical energy from external power source 40 is typically the cheapest or most cost-effective source of power (electrical energy from the public power grid is usually cheaper than that created by a gasoline-driven engine and generator), method 200 preferably uses the external power source whenever possible. Any suitable combination and/or sequence of actions may be used by step 212 to provide the hybrid vehicle with electrical energy from external power source 40. One action that may be part of step 212 involves the provision of low voltage power to the various electronic modules in the hybrid vehicle. When the hybrid vehicle is 'off' (e.g., before step 204), only a minimum number of electronic modules are typically operating; thus, the low voltage draw by the hybrid vehicle is quite low and can usually be met by charger 30, which may have a low voltage output feature. When the hybrid vehicle is 'on' or activated (e.g., after step 204), additional electronic modules are operating and they accordingly require additional low voltage power. In those embodiments where the low voltage output of charger 30 is insufficient to satisfy all of the electronic modules and other devices requesting low voltage power, step 212 may deactivate the low voltage output feature of charger 30 and instead activate or otherwise turn-on the accessory power module (APM) 110, which is capable of providing an increased amount of low voltage power.

Step 220 then determines if the vehicle user is ready to operate or drive the hybrid vehicle and, if so, then steps are taken to prepare the vehicle for operation, step 222. Skilled artisans will appreciate that any number of different methods, algorithms, techniques, processes, etc. may be used by steps 220 and/or 222. If step 220 determines that the vehicle user is not ready to operate the hybrid vehicle, then the method simply loops back to step 210 for continued monitoring. As long as it is not necessary to activate auxiliary power source 22 and the vehicle user is not ready to drive away in the hybrid vehicle, external power source 40 can continue to supply the hybrid vehicle with low cost electricity. This monitoring loop continues until steps 210 or 220 determine otherwise.

If, on the other hand, step 210 determines that auxiliary power source 22 is needed in order to satisfy the request to start the hybrid vehicle, then step 214 may perform a sequence of steps so that the auxiliary power source or some other internal power source can provide the hybrid vehicle with the electrical energy that it needs. Any suitable combination and/or sequence of actions may be used by step 214 to provide the hybrid vehicle with electrical energy from auxiliary power source 22. This includes, for example, deactivating external power source 40 and/or any other components that are used to provide the hybrid vehicle with power from the external power source. As stated above, some hybrid vehicles prohibit simultaneously receiving high voltage electrical energy from both external and internal power sources. If external power source 40 is not currently activated, then it may not be necessary to deactivate or disconnect it.

In one exemplary embodiment, step 214 deactivates or disconnects external power source 40 by opening one or more charging contactors 42 that connect the external power source to the primary power source, and then activates the auxiliary power source 22 by turning on engine 60/generator 62 so that they can provide electrical energy to the hybrid vehicle. With charger 30 'deactivated' or 'off', it may be necessary to activate accessory power module (APM) 110 so that low voltage components in the vehicle, like the various electronic modules and units, are provided with operating power. Charging contactors 42 are typically closed when the hybrid vehicle is being charged by external power source 40. If charging contactors 42 are already closed when step 210 determines that activation of the auxiliary power source is necessary, then step 214 may need to open the charging contactors and provide confirmation that they have been opened to control system 24 before turning engine 60 'on'. If charger 30 is connected to external power source 40 but is not currently activated (e.g., if the battery is fully charged), then the charging contactors may already be opened and changing their state may be unnecessary. In general, step 214 may perform whatever steps are necessary to disable or deactivate external power source 40 and enable or activate auxiliary power source 22; this can include other actions in addition to or in lieu of those described above.

Following this step, the method may continue to loop through steps 220, 210, 212 and/or 214 and monitor the hybrid vehicle, as needed and as previously explained. If during this process, the method determines that auxiliary power source 22 is no longer needed to satisfy the request to start the hybrid vehicle which is still connected to external power source 40, then the auxiliary power source (e.g., engine 60/generator 62) can be deactivated or otherwise turned off and the external power source can re-activated or otherwise turned on so that the hybrid vehicle can again utilize the electrical energy from the public utility grid. If step 220 determines that the user is ready to drive or otherwise operate the hybrid vehicle, then step 222 may take whatever steps or other preparations are necessary for such actions.

The various steps, algorithms, methods, etc. described herein may be performed or executed by any number of different components, devices, modules, systems, etc., including control system 24, hybrid control unit 80 and/or body control unit 90. As explained above, some hybrid vehicles do not determine whether or not it is necessary to activate an auxiliary power source like engine 60/generator 62; instead, they simply turn on the engine/generator as soon as they receive a request to start the vehicle. This can result in diminished fuel economy.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps illustrated in FIG. 2 is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for starting a hybrid vehicle, comprising the steps of:
   (a) receiving a request to start a hybrid vehicle having a primary power source and an auxiliary power source while the hybrid vehicle is connected to an external power source and the auxiliary power source is deactivated;
   (b) determining if the auxiliary power source is needed in order to satisfy the request to start the hybrid vehicle while the hybrid vehicle is connected to the external power source and the auxiliary power source is deactivated; and
   (c) if the method determines that the auxiliary power source is needed in order to satisfy the request to start the hybrid vehicle then deactivating the external power source and activating the auxiliary power source while the hybrid vehicle is connected to the external power source, and if the method determines that the auxiliary power source is not needed in order to satisfy the request to start the hybrid vehicle then activating or keeping active the already connected external power source and keeping the auxiliary power source deactivated.

2. The method of claim 1, wherein step (a) further comprises receiving a wireless request to remotely start the hybrid vehicle at a body control unit.

3. The method of claim 1, wherein step (b) further comprises determining if the auxiliary power source is needed in order to satisfy the request to start the hybrid vehicle by evaluating whether or not a battery is in a depleted state or is experiencing a failure.

4. The method of claim 1, wherein step (b) further comprises determining if the auxiliary power source is needed in order to satisfy the request to start the hybrid vehicle by evaluating whether or not the overall electrical demand in the hybrid vehicle exceeds the electrical energy available from the external power source.

5. The method of claim 1, wherein step (b) further comprises determining if the auxiliary power source is needed in order to satisfy the request to start the hybrid vehicle by evaluating whether or not there is a "time-of-day-constraint" that prohibits charging a battery at that time.

6. The method of claim 1, wherein if the method determines that the auxiliary power source is needed in order to satisfy the request to start the hybrid vehicle then step (c) further comprises deactivating the external power source by opening one or more charging contactors that connect the external power source to the primary power source, and activating the auxiliary power source by turning on an engine that drives a generator that creates electrical energy.

7. The method of claim 1, wherein if the method determines that the auxiliary power source is needed in order to satisfy the request to start the hybrid vehicle then step (c) further comprises deactivating the external power source, providing confirmation that the external power source has been deactivated, and activating the auxiliary power source in response to the confirmation.

8. The method of claim 1, further comprising the step of:
   activating a vehicle propulsion system in response to the request to start the hybrid vehicle by closing one or more main contactors, and providing electrical energy from the external power source to the hybrid vehicle after the vehicle propulsion system is active.

9. The method of claim 1, further comprising the step of:
   deactivating a charger output that provides low voltage electrical energy to the hybrid vehicle and activating an accessory power module (APM) that provides low voltage electrical energy to the hybrid vehicle.

10. The method of claim 1, further comprising the step of:
    continuing to monitor the hybrid vehicle and if the method determines that the auxiliary power source is no longer needed to satisfy the request to start the hybrid vehicle, then deactivating the auxiliary power source and re-activating the external power source.

11. A method for starting a hybrid vehicle, comprising the steps of:
    (a) receiving a request to start a hybrid vehicle having a primary power source and an auxiliary power source while the hybrid vehicle is connected to an external power source and the auxiliary power source is deactivated;
    (b) activating a vehicle propulsion system while the hybrid vehicle is connected to the external power source in response to the request to start the hybrid vehicle by closing one or more main contactors in the hybrid vehicle; and
    (c) providing electrical energy from the already connected external power source to the hybrid vehicle after the vehicle propulsion system has been activated, instead of automatically deactivating the external power source in response to the request to start the hybrid vehicle.

12. The method of claim 11, wherein step (a) further comprises receiving a wireless request to remotely start the hybrid vehicle at a body control unit.

13. The method of claim 11, wherein step (b) further comprises determining if the auxiliary power source is needed in order to satisfy the request to start the hybrid vehicle.

14. The method of claim 13, wherein step (b) further comprises determining if the auxiliary power source is needed in order to satisfy the request to start the hybrid vehicle by evaluating whether or not the overall electrical demand in the hybrid vehicle exceeds the electrical energy available from the external power source.

15. The method of claim 13, wherein step (b) further comprises determining if the auxiliary power source is needed in order to satisfy the request to start the hybrid vehicle by evaluating whether or not there is a "time-of-day-constraint" that prohibits charging a battery at that time.

16. The method of claim 13, wherein if the method determines that the auxiliary power source is needed in order to satisfy the request to start the hybrid vehicle then step (c) further comprises deactivating the external power source by opening one or more charging contactors that connect the external power source to the primary power source, and activating the auxiliary power source by turning on an engine that drives a generator that creates electrical energy.

17. The method of claim 16, wherein if the method determines that the auxiliary power source is needed in order to satisfy the request to start the hybrid vehicle then step (c) further comprises deactivating the external power source, providing confirmation that the external power source has been deactivated, and activating the auxiliary power source in response to the confirmation.

18. The method of claim 11, further comprising the step of:
deactivating a charger output that provides low voltage electrical energy to the hybrid vehicle and activating an accessory power module (APM) that provides low voltage electrical energy to the hybrid vehicle.

19. The method of claim 11, further comprising the step of:
continuing to monitor the hybrid vehicle and if the method determines that the auxiliary power source is no longer needed to satisfy the request to start the hybrid vehicle, then deactivating the auxiliary power source and re-activating the external power source.

20. A hybrid vehicle, comprising:
a primary power source connected to an external power source;
an auxiliary power source;
a vehicle propulsion system; and
a control system, wherein in response to receiving a request to start the hybrid vehicle, the control system: i) activates the vehicle propulsion system, ii) determines if the auxiliary power source is needed in order to satisfy the request to start the hybrid vehicle, and iii) deactivates the external power source and activates the auxiliary power source while the primary power source is connected to the external power source if the control system determines that the auxiliary power source is needed in order to satisfy the request to start the hybrid vehicle, and activates or keeps active the already connected external power source and deactivates or keeps deactive the auxiliary power source if the control system determines that the auxiliary power is not needed in order to satisfy the request to start the hybrid vehicle.

* * * * *